(12) United States Patent
Kang et al.

(10) Patent No.: US 8,619,277 B2
(45) Date of Patent: Dec. 31, 2013

(54) METHODS AND SYSTEMS FOR SUSPENDING AND RESUMING PRINT JOBS BASED ON PRIORITY

(75) Inventors: Junjie Kang, Beijing (CN); Hui Zhao, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 692 days.

(21) Appl. No.: 12/744,635

(22) PCT Filed: Nov. 26, 2008

(86) PCT No.: PCT/CN2008/073205
§ 371 (c)(1),
(2), (4) Date: Aug. 9, 2010

(87) PCT Pub. No.: WO2009/076829
PCT Pub. Date: Jun. 25, 2009

(65) Prior Publication Data
US 2011/0013221 A1    Jan. 20, 2011

(30) Foreign Application Priority Data

Nov. 26, 2007   (CN) .......................... 2007 1 0178099

(51) Int. Cl.
*G06K 15/00* (2006.01)
*G06F 3/12* (2006.01)

(52) U.S. Cl.
USPC ........ 358/1.14; 358/1.15; 358/1.16; 358/1.17

(58) Field of Classification Search
USPC ............................ 358/1.14, 1.15, 1.17, 1.16
See application file for complete search history.

(56) References Cited

U.S. PATENT DOCUMENTS

| 5,832,301 | A |   | 11/1998 | Yamaguchi |
|---|---|---|---|---|
| 2002/0181008 | A1 |   | 12/2002 | Nozaki |
| 2003/0020944 | A1 | * | 1/2003 | Bhogal et al. ................. 358/1.15 |
| 2006/0159480 | A1 | * | 7/2006 | Mima et al. ..................... 399/82 |
| 2007/0070376 | A1 |   | 3/2007 | Owen et al. |
| 2009/0002726 | A1 | * | 1/2009 | Osadciw ....................... 358/1.6 |

FOREIGN PATENT DOCUMENTS

| CN | 1388442 A | 1/2003 |
|---|---|---|
| CN | 1936827 A | 3/2007 |

* cited by examiner

*Primary Examiner* — Fred Guillermety
(74) *Attorney, Agent, or Firm* — The Webb Law Firm

(57) ABSTRACT

Disclosed is a method for processing print jobs, comprising: determining whether a second print job being processed by an RIP is needed to pause and whether a third print job being processed by a print device is needed to pause according to a priority of a first print job requesting to be printed; storing, where the second print job is needed to pause, a processing state of the second print job and processing the first print job by the RIP; storing, where the third print job is needed to pause, a processing state of the third print job, and printing the first print job by the print device; resuming the processing for the second print job according to the stored processing state of the second print job after the first print job is processed by the RIP; and resuming the processing for the third print job according to the stored processing state of the third print job after the first print job is printed by the print device. According to the present invention, it is possible to proceed with pauses continuously, save costs and simplify manual operations.

14 Claims, 4 Drawing Sheets

METHODS AND SYSTEMS FOR SUSPENDING AND RESUMING PRINT JOBS BASED ON PRIORITY

FIELD OF THE INVENTION

The present invention relates to the field of printing technology, in particular to methods and systems for processing print jobs.

BACKGROUND OF THE INVENTION

A print server needs a long time to process a job with a large number of pages and thus will be occupied by this job for the long time. During processing the job, the print server cannot accept any other jobs. In the prior art, if the print server receives a rush print job when processing the large-scale job, the print server will let the currently processed job pause and then process the rush job. Although the rush job can be processed by doing so, the output portions of the paused large-scale job will be dropped and wasted. Furthermore, if the paused job is a single-sided job, it can be resumed manually. However, the manual operation for the resumption is complicated and fallible. In addition, many special printing tasks, such as double-sided printing, mixed printing and one-by-one printing, cannot be processed in the prior art.

SUMMARY OF THE INVENTION

The present invention provides methods and systems for processing print jobs so as to solve at least one of the problems that various print jobs cannot be processed cooperatively and the paused print job printed in part is invalid.

The present invention provides a method for processing print jobs, comprising:
  determining whether a second print job being processed by an RIP (raster image processor) is needed to pause according to a priority of a first print job requesting to be printed;
  storing, where the second print job is needed to pause, a processing state of the second print job and processing the first print job by the RIP;
  determining whether a third print job being processed by a print device is needed to pause according to the priority of the first print job;
  storing, where the third print job is needed to pause, a processing state of the third print job, and printing the first print job by the print device after the first print job is processed by the RIP;
  resuming the processing for the second print job according to the stored processing state of the second print job after the first print job is processed by the RIP; and
  resuming the processing for the third print job according to the stored processing state of the third print job after the first print job is printed by the print device.

The present invention also provides a system for processing print jobs, comprising:
  an RIP;
  a print device;
  a first pause module configured to determine whether a second print job being processed by the RIP is needed to pause according to a priority of a first print job requesting to be printed, wherein if the second print job is needed to pause, the first pause module stores a processing state of the second print job and transmits the first print job to the RIP for processing;
  a second pause module configured to determine whether a third print job being processed by the print device is needed to pause according to the priority of the first print job, wherein if the third print job is needed to pause, the second pause module stores a processing state of the third print job, and transmits the first print job to the print device for printing after the first print job is processed by the RIP;
  a first resumption module configured to resume the processing of the second print job by the RIP according to the stored processing state of the second print job after the first print job is processed by the RIP; and
  a second resumption module configured to resume the processing of the third print job by the print device according to the stored processing state of the third print job after the first print job is printed by the print device.

The provided solutions of the present invention may have at least one of the following advantages.

According to the present invention, when print jobs are processed, it is to determine whether the print job being processed by the RIP is needed to pause and whether the print job being printed by the print device is needed to pause, based on a priority of the print job requesting to be printed. If the print jobs are needed to pause, states of processing the print jobs by the RIP and the print device are stored respectively. Then, after a rush print job having a high priority is processed, the paused print jobs can be resumed according to the stored processing states. It can be seen that print jobs are processed according to their priorities instead of a changeless order, since the process for processing jobs is adjusted (such as the pause or resumption of a job) based on priorities according to the present invention. Thus, solutions capable of processing rush jobs having high priority in a printing process are provided. The printer may not be occupied by a job for a long time, in particular, in the case of processing large-scale jobs. Moreover, the output portions of a paused job will not be wasted when the job pauses due to a rush job, since the paused print job will be resumed based on the processing state thereof stored at the pause. Thus, some problems in the prior art can be solved. The pause and resumption of the jobs can be carried out automatically. Furthermore, it is possible to proceed with pauses continuously, save costs and simplify manual operations.

DESCRIPTION OF THE PREFERRED EMBODIMENTS

Hereinafter, a detailed description of embodiments of the present invention will be given with reference to the appended drawings.

Figure 1:
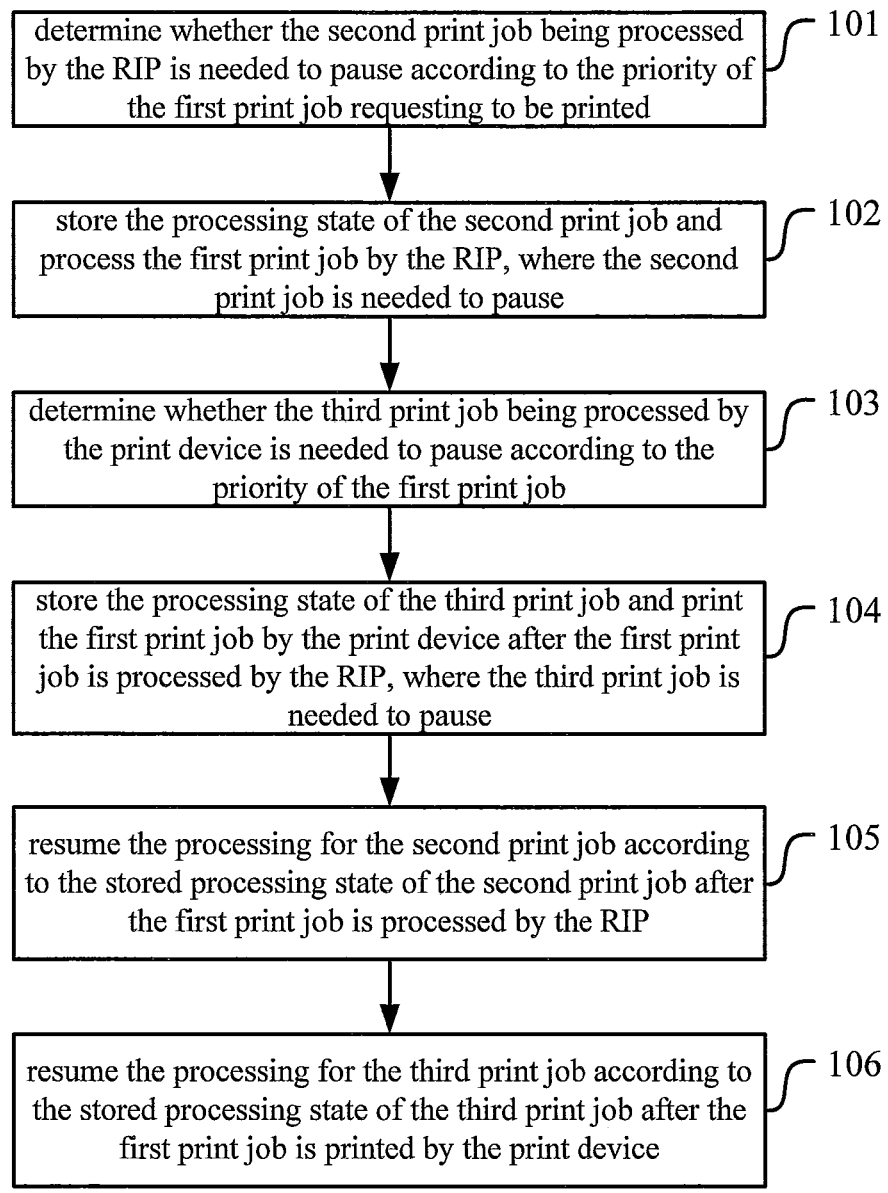
FIG. 1 is a flowchart illustrating an implementation of a method for processing print jobs according to an embodiment of the present invention.

FIG. 1 is a flowchart illustrating an implementation of a method for processing print jobs. During the process, a concept of priority is introduced. The priority can be set as required, for example, according to the degree of urgency for printing, the degree of importance and so on. In practice, a print job having higher priority may be processed earlier. A print job will be processed by an RIP and then printed by a print device. For the ease of description, in embodiments, the print job to be processed and printed in advance is named as the first print job, the print job being processed by the RIP is named as the second print job, and the print job being processed by the print device is named as the third print job. As shown in FIG. 1, a method for processing print jobs may comprise the following steps.

In Step 101, it is determined whether the second print job being processed by the RIP is needed to pause, according to the priority of the first print job requiring to be printed.

If it is determined in Step 101 that the second print job being processed by the RIP is needed to pause, in Step 102, the processing state of the second print job is stored and the first print job is processed by the RIP.

In Step 103, it is determined whether the third print job being processed by the print device is needed to pause, according to the priority of the first print job.

If it is determined in Step 103 that the third print job is needed to pause, in Step 104, the processing state of the third print job is stored and the first print job is printed by the print device after being processed by the RIP.

After the processing of the first print job provided by the RIP is completed, the processing for the second print job is resumed in Step 105 according to the processing state of the second print job which is previously stored.

After the printing of the first print job provided by the print device is completed, the processing for the third print job is resumed in Step 106 according to the processing state of the third print job which is previously stored.

In an implementation, when the processing state of the second print job is stored in the step 102, if the data output from the second print job before the pause is incomplete, the incomplete data is dropped and a page counter is adjusted to have a correct value.

Dropping the invalid data is to ensure the completeness of the structure of job pages, in which the invalid data refer to incomplete page output data such as page bitmap data. Since the incomplete page output data cannot be completed by the RIP in a subsequent recovering, but only can be re-generated, the incomplete page output data can be dropped. The so-called "incomplete" means that the currently output page is not a complete page. In the circumstances, some of the bitmap data and a page finish symbol will be lost in the page due to the pause, and thus the page cannot be processed subsequently.

Adjusting the page counter to have a correct value and storing the value at the pause of the RIP mainly comprises adjusting the output counter to have a valid page count. In particular, this may be carried out by counting the pages including the finish symbol.

If it is determined in steps 102 and 104 that the second print job being processed by the RIP and the third print job being printed by the print device are needed to pause, the following steps may be further included:

1. judging whether the second print job and the third print job are the same print job; and
2. making the third print job paused, storing the processing state of the third print job, and then making the second print job paused, and storing the processing state of the second print job, if the second print job and the third print job are the same one.

The purpose of these steps is to enable the pause operation when there are a direct print output job and a hold print job in different procedures. Then, the first print job to be processed urgently may be processed in any conditions. The difference between the direct print output job and the hold print job will be described in detail hereinafter.

Where the second print job is determined to pause in the step 102, the processing for the second print job can pause at the time when the end of the current page of the second print job is processed by the RIP.

Similarly, where the third print job is determined to pause in the step 104, the printing for the third print job can pause at the time when the end of the current page of the third print job has been processed by the print device.

Accordingly, when the paused second print job is resumed, the processing of the second print job can be resumed by the RIP from the end of the page stored at the time of pause.

Moreover, when the paused third print job is resumed, the processing of the third print job by the print device can be resumed from the end of the page stored at the time of pause.

By this way, the completeness of the processed pages of a print job can be ensured by the print job being pausing at the end of a page, when the pause occurs for processing a rush print job. Furthermore, the completeness of data also can be ensured when the paused job is resumed.

Where the third print job is needed to pause, the step 104 may further comprise:
  judging whether the print device is performing a double-sided printing, if it is the case, the third print job pauses after the back side of the page being output is printed completely; or
  judging whether the third print job is a double-sided print job, if it is the case, the third print job pauses by the print device after the back side of the page being output is printed completely.

The step 104 may further comprise, prior to printing the first print job by the print device:
  judging whether the print device has two or more paper-providing boxes, if it is the case, the print device uses papers from a box different from that for the third print job to print the first print job.

Where the second print job being processed by the RIP is determined to pause, the method may comprise:
  identifying the print property of the first print job and processing the pauses of the second and third print jobs according to the print property of the first print job.

Where the first print job is identified to have a "direct" print property and the third print job is determined to pause based on priorities, the third print job pauses and the processing state of the third print job is stored firstly, and then the second print job pauses and the processing state of the second print job is stored. Subsequently, the first print job is processed by the RIP and the processed first print job is transmitted to the print device for printing.

Where the first print job is identified to have a "hold" print property, the second print job pauses and the state of processing the second print job is stored. Then, it is to determine whether the third print job being processed by the print device is needed to pause based on the priority of the first print job.

In an implementation, when the first print job is processed, the request for pause can be maintained by retrying after a while if the RIP cannot pause.

According to the above description, the embodiment may ensure that the paused job can be resumed to be output from the page next to the last page output previously, and correct output parameters can be set.

Hereinafter, another embodiment of the present invention will be described in detail.

Figure 2:
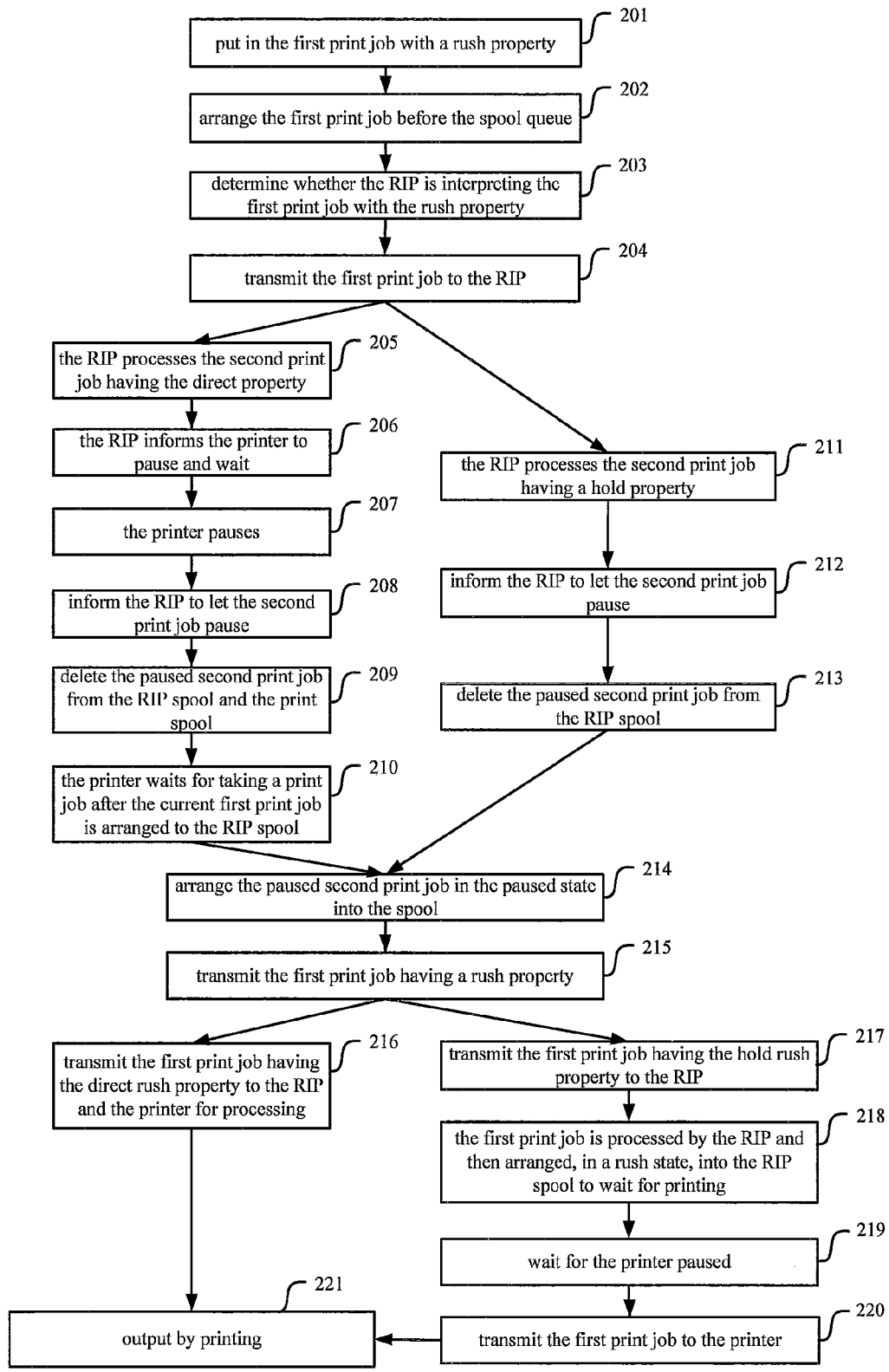
FIG. 2 is a flowchart illustrating another implementation of a method for processing print jobs according to an embodiment of the present invention.

FIG. 2 is a flowchart illustrating another implementation of the method for processing print jobs. The meanings of some terms in this figure are as below.

"Rush": means the print job has a rush property. In the embodiment, the print job with the highest priority is defined to have a rush property. A "rush" job means the job has a rush property. A "rush" state means the operation state of the job process having a rush property.

"Spool": represents the print job queue to be printed.

"Direct": represents the direct print property. A "direct" job means the print job should be printed directly. This kind of job should not be held, and the data of the job generated by the RIP are transmitted to the print device directly for printing. The RIP and the print device can process the same print job with the direct property at the same time. A "direct rush" job represents the job with a rush property, which should be printed directly.

"Printer": means the print device in this embodiment and represents a printer or the like in implementation.

"Paused": means the job has a pause property or is in pause. A "paused" job means the print job pauses or the print job is in the pause state. A "paused" state represents the state being pausing or in pause.

"Hold": represents the hold property which means the print job should be transmitted to the printer for outputting after the job is fully processed by the RIP. A "hold" job means the print job has a hold state. "hold rush" represents a rush job in the hold state.

As shown in FIG. 2, the method of processing print jobs may comprise the following steps.

Step 201 is to put in a first print job with a rush property, which has the highest priority and thus should be printed urgently in the embodiment.

Step 202 is to arrange the first print job in the head of a spool queue.

Step 203 is to determine whether the RIP is interpreting the first print job with the rush property. In this step, the "interpreting", a function of the RIP, is a preparation before the print job is transmitted.

Step 204 is to transmit the first print job to the RIP. If the RIP is processing a second print job having a direct property, the process turns to step 205. On the contrary, if the RIP is processing a second print job having a hold property, the process turns to step 211.

In the step 205, the RIP processes the second print job having the direct property.

In the step 206, the RIP informs the printer to pause and wait.

In the step 207, the printer pauses.

Step 208 is to inform the RIP to let the second print job pause.

Step 209 is to delete the paused second print job from the RIP spool and the print spool.

In the step 210, the printer waits for taking a print job after the current first print job is arranged to the RIP spool. Then, the process turns to step 214.

In the step 211, the RIP processes the second print job having a hold property.

Step 212 is to inform the RIP to let the second print job pause.

Step 213 is to delete the paused second print job from the RIP spool. Then, the process turns to step 214.

Step 214 is to arrange the paused second print job in the paused state into the spool.

Step 215 is to transmit the first print job having a rush property. If the first print job is a job having a direct rush property, the process turns to step 216. On the contrary, if the first print job is a job having a hold rush property, the process turns to step 217.

Step 216 is to transmit the job to the RIP and the printer for processing. Then, the process turns to step 221.

Step 217 is to transmit the job to the RIP.

In step 218, the job is processed by the RIP and then arranged, in a rush state, into the RIP spool to wait for printing.

Step 219 is to wait for the printer paused.

Step 220 is to transmit the first print job to the printer.

Step 221 is to output by printing.

Figure 3:
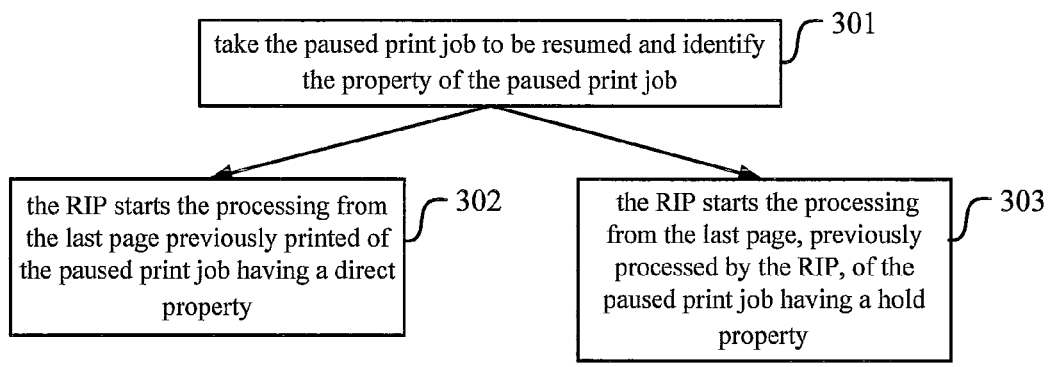
FIG. 3 is a flowchart illustrating an implementation of resuming a job in the RIP according to an embodiment of the present invention.

FIG. 3 is a flowchart illustrating an implementation of resuming a job in the RIP. As shown in FIG. 3, the RIP may let the currently processed print task pause due to a rush print job. After the rush print job is processed, the process of resuming the paused print task may comprise the following steps.

Step 301 is to take the paused print job to be resumed and identify the property of the paused print job. If the job has a direct property, the process turns to the step 302. On the contrary, if the job has a hold property, the process turns to the step 304. In the embodiment, the paused print job is the second print job.

In the step 302, the RIP starts the processing from the last page previously printed of the paused print job.

In the step 303, the RIP starts the processing from the last page, previously processed by the RIP, of the paused print job.

Figure 4:
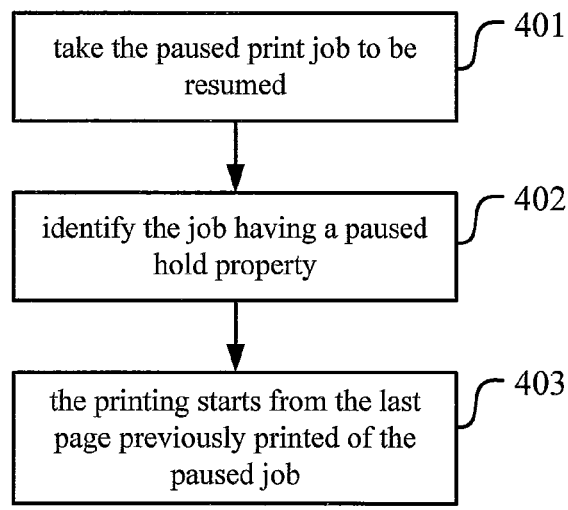
FIG. 4 is a flowchart illustrating an implementation of resuming a job in the print device according to an embodiment of the present invention.

FIG. 4 is a flowchart illustrating an implementation of resuming a job in the print device. As shown in FIG. 4, the print device may let the currently processed print task pause due to a rush print job. After the rush print job is processed, the process of resuming the paused print task may comprise the following steps.

Step 401 is to take the paused print job to be resumed. In the embodiment, the paused print job is the third print job.

Step 402 is to identify the job having a paused hold property. Since the job having a direct property will be printed directly, the job to be resumed in this step must be a print job having a hold property.

In the step 403, the printing starts from the last page previously printed of the paused job.

The present invention also provides a system for processing print jobs. Hereinafter, a detailed description of embodiments of the system will be given with reference to the appended drawings.

Figure 5:
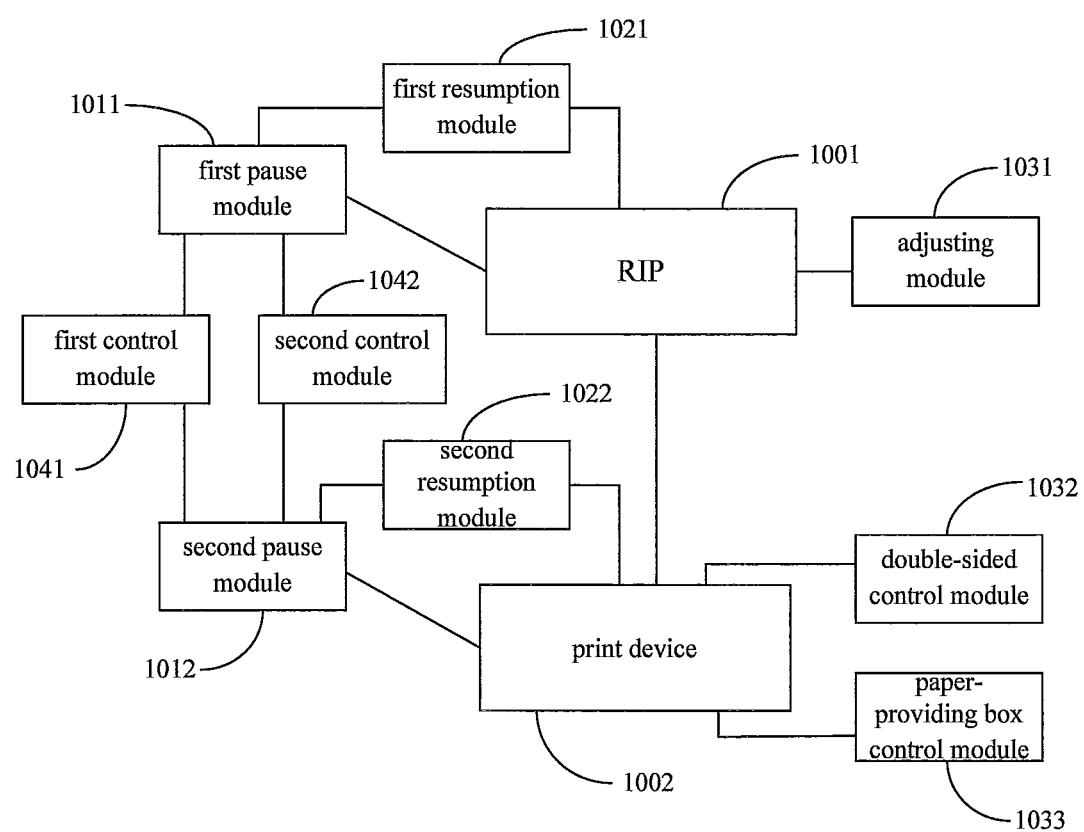
FIG. 5 shows the configuration of a system for processing print jobs according to an embodiment of the present invention.

FIG. 5 shows the configuration of a system for processing print jobs. As shown in FIG. 5, the system comprises an RIP 1001, a print device 1002, a first pause module 1011, a second pause module 1012, a first resumption module 1021 and a second resumption module 1022.

The first pause module 1011 is connected with the RIP 1001 and used to determine whether the second print job being processed by the RIP 1001 is needed to pause according to the priority of the first print job requesting to be printed. Where the second print job is needed to pause, the first pause module 1011 stores the processing state of the second print job and transmits the first print job to the RIP 1001 for processing.

The second pause module 1012 is connected with the print device 1002 and used to determine whether the third print job being processed by the print device 1002 is needed to pause according to the priority of the first print job. Where the third print job is needed to pause, the second pause module 1012 stores the processing state of the third print job, and transmits the first print job to the print device 1002 for printing after the first print job is processed by the RIP 1001.

The first resumption module 1021 is connected with the first pause module 1011 and the RIP 1001 and used for resuming the processing of the second print job by the RIP 1001 according to the stored processing state of the second print job after the first print job is processed by the RIP 1001.

The second resumption module 1022 is connected with the second pause module 1012 and the print device 1002 and used to resume the processing of the third print job by the print device 1002 according to the stored state of processing the third print job after the first print job is printed by the print device 1002.

The system may further comprise an adjusting module 1031 connected with the RIP 1001. The adjusting module 1031 is used to drop incomplete data which are output at the pause of the second print job determined by the first pause module 1011, and used to adjust a page counter to have a correct value.

The system may further comprise a first control module 1041 connected with the first pause module 1011 and the second pause module 1021. The first control module 1041 is used to identify whether the second print job and the third print job are the same print job, when each of the second and third print jobs is needed to pause. If the second and third print jobs are the same, the first control module 1041 controls the second pause module 1012 to let the third print job pause and to store the processing state of the third print job. Then, the first control module 1041 controls the first pause module 1011 to let the second print job pause and to store the processing state of the second print job.

To ensure the completeness of the page being printed at the pause, when the second print job is determined to pause, the first pause module 1011 of the system may let the processing for the second print job pause at the end of processing a whole page of the second print job by the RIP 1001.

Similarly, when the third print job is determined to pause, the second pause module 1012 may let the printing for the third print job pause at the end of processing a whole page of the third print job by the print device 1002.

Accordingly, when the paused second print job is resumed, the first resumption module 1021 may resume the processing of the second print job from the end of the page stored at the time of pause.

Moreover, when the paused third print job is resumed, the second resumption module 1022 may resume the processing of the third print job from the end of the page stored at the time of pause.

To adapt to implement double-sided print tasks, the system may further comprise a double-sided control module 1032 connected with the print device 1002. When the third print job is needed to pause, the double-sided control module 1032 may judge whether the print device 1002 is performing a double-sided printing. If the print device 1002 is performing a double-sided printing, the third print job pauses after the back side of the page being output is printed completely. Alternatively, when the third print job is needed to pause, the double-sided control module 1032 is used to judge whether the third print job is a double-sided print job. If the third print job is double-sided, the third print job pauses by the print device 1002 after the back side of the page being output is printed completely.

Where the print device 1002 has more than one paper-providing box, the system may further comprise a paper-providing box control module 1033 connected with the print device 1002. Before the print device 1002 prints the first print job, the paper-providing box control module 1033 may judge whether the print device 1002 has two or more paper-providing boxes. If the print device 1002 has two or more paper-providing boxes, the print device 1002 uses a box different from that for the third print job to print the first print job.

To adapt to process print jobs with various properties, the system may further comprise a second control module 1042 connected with the first pause module 1011 and the second pause module 1012. Where the second print job being processed by the RIP 1001 is determined to pause, the second control module 1042 may identify the print property of the first print job and control the pauses of the second and third print jobs according to the print property of the first print job.

The second control module 1042 may comprise a first processing unit and a second processing unit.

Where the first print job is identified to have a direct print property and the third print job is determined to pause based on priorities, the first processing unit is used for controlling the first pause module 1011 to let the third print job pause and to store the processing state of the third print job, and then for controlling the second pause module 1012 to let the second print job pause and to store the processing state of the second print job.

Where the first print job is identified to have a hold print property, the second processing unit is used to control the second pause module 1012 to determine whether the third print job being processed by the print device 1002 is needed to pause based on the priority of the first print job, after the second pause module 1012 is controlled to let the second print job pause and to store the processing state of the second print job.

According to the above description of the embodiments of the present invention, special print jobs can be processed and solutions capable of processing rush jobs in a printing process are provided. The problem that the printer only can process jobs one by one in order can be solved, in particular, for large-scale jobs. The printer may not be occupied by a large-scale job for a long time. Moreover, the output portions of a paused job will not be wasted when the job pauses due to a rush job. According to the embodiments of the present invention, the process for processing jobs (such as the pause or resumption of a job) is adjusted based on priorities. Thus, some problems in the prior art can be solved. The pause and resumption of the jobs can be carried out automatically. Furthermore, it is possible to proceed with pauses continuously, save costs and simplify manual operations.

The present invention is not limited to the descriptions and embodiments mentioned above. Variations and modification made by those skilled in the art according to the disclosure herein should be within the scope of the present invention.

The invention claimed is:

1. A method for processing print jobs, comprising:
   determining whether a second print job being processed by an RIP is needed to pause according to a priority of a first print job requesting to be printed;
   storing, where the second print job is needed to pause, a processing state of the second print job and processing the first print job by the RIP;
   determining whether a third print job being processed by a print device is needed to pause according to the priority of the first print job;
   storing, where the third print job is needed to pause, a processing state of the third print job, and printing the first print job by the print device after the first print job is processed by the RIP;
   resuming the processing for the second print job according to the stored processing state of the second print job after the first print job is processed by the RIP; and resuming the processing for the third print job according to the stored processing state of the third print job after the first print job is printed by the print device, wherein when the second print job being processed by the RIP is needed to pause, the method further comprises the following step:

identifying a print property of the first print job and performing the pauses of the second and third print jobs according to the print property of the first print job, and wherein when the first print job is identified to have a direct print property and the third print job is needed to pause according to the priorities, the third print job pauses and the processing state of the third print job is stored, then the second print job pauses and the processing state of the second print job is stored, and then the first print job is processed by the RIP and the processed first print job is transmitted to the print device for printing; and when the first print job is identified to have a hold print property, the second print job pauses and the processing state of the second print job is stored, and then it is to determine whether the third print job being processed by the print device is needed to pause according to the priority of the first print job.

2. The method according to claim 1, wherein the step of storing a processing state of the second print job further comprises:

dropping, if data output when the second print job pauses is incomplete, the incomplete data and adjusting a page counter to have a correct value.

3. The method according to claim 1, further comprising, where the second and third print jobs are needed to pause, the following steps:

determining whether the second print job and the third print job are the same print job; and if the second print job and the third print job are the same, making the third print job to pause, storing the processing state of the third print job, and then making the second print job to pause, and storing the processing state of the second print job.

4. The method according to claim 1, wherein the processing of the second print job pauses by the RIP at the end of processing a whole page of the second print job, when the second print job is determined to pause; and/or the printing of the third print job pauses by the print device at the end of processing a whole page of the third print job, when the third print job is determined to pause.

5. The method according to claim 4, further comprising:

resuming the processing of the second print job by the RIP from the end of the whole page stored at the time of the pause of the second print job, when the paused second print job is resumed; and/or resuming the printing of the third print job by the print device from the end of the whole page stored at the time of the pause of the third print job, when the paused third print job is resumed.

6. The method according to claim 1, further comprising, where the third print job is needed to pause, the following steps:

determining whether the print device is performing a double-sided printing, if it is the case, the third print job pauses after a back side of a page being output is printed completely; or determining whether the third print job is a double-sided print job, if it is the case, the third print job pauses by the print device after the back side of the page being output is printed completely.

7. The method according to claim 1, further comprising, before the print device prints the first print job, the following step:

determining whether the print device has two or more paper-providing boxes, if it is the case, the print device uses one of the boxes, which is different from that for the third print job, for the printing of the first print job.

8. A system for processing print jobs, comprising:

an RIP;

a print device;

a first pause module configured to determine whether a second print job being processed by the RIP is needed to pause according to a priority of a first print job requesting to be printed, wherein if the second print job is needed to pause, the first pause module stores a processing state of the second print job and transmits the first print job to the RIP for processing;

a second pause module configured to determine whether a third print job being processed by the print device is needed to pause according to the priority of the first print job, wherein if the third print job is needed to pause, the second pause module stores a processing state of the third print job and transmits the first print job to the print device for printing after the first print job is processed by the RIP;

a first resumption module configured to resume the processing of the second print job by the RIP according to the stored processing state of the second print job after the first print job is processed by the RIP;

a second resumption module configured to resume the processing of the third print job by the print device according to the stored processing state of the third print job after the first print job is printed by the print device; and a second control module configured to identify a print property of the first print job and control pauses of the second and third print jobs according to the print property of the first print job, when the second print job being processed by the RIP is needed to pause, wherein the second control module comprises:

a first processing unit configured for, when the first print job is identified to have a direct print property and the third print job is needed to pause based on the priorities, controlling the first pause module to let the third print job pause and to store the processing state of the third print job, and then controlling the second pause module to let the second print job pause and to store the processing state of the second print job; and a second processing unit configured for, when the first print job is identified to have a hold print property, controlling the second pause module to let the second print job pause and to store the processing state of the second print job, and then controlling the second pause module to determine whether the third print job being processed by the print device is needed to pause based on the priority of the first print job.

9. The system according to claim 8, further comprising:

an adjusting module configured to drop incomplete data which are output at a pause of the second print job determined by the first pause module, and to adjust a page counter to have a correct value.

10. The system according to claim 8, further comprising:

a first control module configured to identify whether the second print job and the third print job are the same print job when each of the second and third print jobs is needed to pause, wherein if the second and third print jobs are the same, the first control module controls the second pause module to let the third print job pause and to store the processing state of the third print job, and then the first control module controls the first pause module to let the second print job pause and to store the processing state of the second print job.

11. The system according to claim 8, wherein
the first pause module is further configured to let the processing of the second print job pause at the end of processing a whole page of the second print job by the RIP when the second print job is determined to pause; and/or
the second pause module is further configured to let the printing of the third print job pause at the end of processing a whole page of the third print job by the print device when the third print job is determined to pause.

12. The system according to claim 11, wherein
the first resumption module is further configured to resume the processing of the second print job from the end of the whole page stored at the time of a pause of the second print job when the paused second print job is resumed; and/or
the second resumption module is further configured to resume the printing of the third print job by the print device from the end of the whole page stored at the time of a pause of the third print job when the paused third print job is resumed.

13. The system according to claim 8, further comprising a double-sided control module,
wherein when the third print job is needed to pause, the double-sided control module is configured to determine whether the print device is performing a double-sided printing, and if the print device is performing a double-sided printing, the third print job pauses after a back side of a page being output is printed completely, or
wherein when the third print job is needed to pause, the double-sided control module is configured to determine whether the third print job is a double-sided print job, and if the third print job is double-sided, the third print job pauses by the print device after the back side of the page being output is printed completely.

14. The system according to claim 8, further comprising:
a paper-providing box control module configured to determine whether the print device has two or more paper-providing boxes before the print device prints the first print job, wherein if the print device has two or more paper-providing boxes, the print device uses one of the boxes, which is different from that for the third print job, for printing of the first print job.

* * * * *

UNITED STATES PATENT AND TRADEMARK OFFICE
CERTIFICATE OF CORRECTION

PATENT NO. : 8,619,277 B2  Page 1 of 1
APPLICATION NO. : 12/744635
DATED : December 31, 2013
INVENTOR(S) : Kang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 767 days.

Signed and Sealed this
Twenty-second Day of September, 2015

Michelle K. Lee
*Director of the United States Patent and Trademark Office*